United States Patent [19]
Kadono et al.

[11] Patent Number: 5,454,112
[45] Date of Patent: Sep. 26, 1995

[54] PERSONAL COMPUTER OR THE LIKE WITH A LIGHT SOURCE CONTROLLER FOR A DISPLAY APPARATUS

[75] Inventors: Masayuki Kadono; Yoshimi Hironaka, both of Tokyo, Japan

[73] Assignee: Kabushiki Kaisha Toshiba, Kanagawa, Japan

[21] Appl. No.: 652,050

[22] Filed: Feb. 8, 1991

[30] Foreign Application Priority Data

Feb. 9, 1990 [JP] Japan ................................. 2-30572
May 25, 1990 [JP] Japan ................................ 2-136694

[51] Int. Cl.⁶ ........................... G06F 1/32; G06F 15/56
[52] U.S. Cl. ........................ 395/750; 364/707; 365/108; 365/111; 365/227
[58] Field of Search ................................. 395/750; 323/234, 323/905; 324/403, 76 R; 340/720; 364/707; 365/227, 108, 111

[56] References Cited

U.S. PATENT DOCUMENTS

| | | | |
|---|---|---|---|
| 3,747,322 | 7/1973 | Eckenrode | 368/87 |
| 4,293,927 | 10/1981 | Hoshii | 395/750 |
| 4,747,041 | 5/1988 | Engel et al. | 395/750 |
| 4,768,162 | 8/1988 | Nishimura | 395/750 |
| 4,782,355 | 11/1988 | Sakai et al. | 395/750 |
| 4,855,892 | 8/1989 | Lower | 363/86 |
| 4,887,165 | 12/1989 | Sato et al. | 358/474 |
| 5,008,846 | 4/1991 | Inoue | 364/707 |
| 5,065,357 | 11/1991 | Shiraishi et al. | 364/707 |
| 5,305,233 | 4/1994 | Kawagoe et al. | 364/526 |

*Primary Examiner*—George B. Davis
*Attorney, Agent, or Firm*—Finnegan, Henderson, Farabow, Garrett & Dunner

[57] ABSTRACT

Auxiliary light source for a display is controlled by a light source controller. The light source controller executes a control operation for turning the auxiliary light source on or off in accordance with detecting a change of supplied power, detecting a command sent from an input device, and detecting a special status, for example the operating status mode of a printer or disk drive.

7 Claims, 6 Drawing Sheets

PERSONAL COMPUTER OR THE LIKE WITH A LIGHT SOURCE CONTROLLER FOR A DISPLAY APPARATUS

BACKGROUND OF THE INVENTION

1. Field of the Invention

The present invention relates to a personal computer or the like with a light source controller which is capable of turning the light source for a display apparatus on and off.

2. Description of Related Art

Recently various embodiments of a word processor or a personal computer, which has a liquid crystal display (LCD) apparatus with an auxiliary light such as a backlight unit, have appeared on the market. Typically, the LCD apparatus consists of transmission type LCD which has electro luminescence (EL) unit as a backlight on the backside. In the word processor or the personal computer, light ON/OFF control is performed upon an ON/OFF operation of a power source switch.

The above arrangement poses no problems in a personal word processor or a personal computer in which operating power is obtained from an external commercial power source. However, the following problems are posed in a compact personal word processor or a personal computer which is reduced in size and weight so as to be easily carried, and is driven by a built-in battery so as to be easily used at any place e.g., a notebook size or pocketbook size. In the above-described arrangement, since the backlight is kept ON while the power switch is ON, the power consumption in a normal operation period is large. Still more, a printing unit or a floppy disk drive (FDD) which is attached in the word processor or the computes requires large power consumption. Therefore, in order to allow long-time use of the word processor or the computer, a large-capacity battery, which has a large size and a heavy weight, is conventionally required. This imposes great limitations on reduction in size and weight of the word processor or the computer. In addition, maintaining the backlight ON, even when an operation is interrupted in the process of processing, inevitably wastes the battery power.

SUMMARY OF THE INVENTION

Accordingly, it is an object of the present invention to provide a personal computer or the like with a light source controller for a display apparatus, which can Greatly reduce the power consumption of the light so as to allow the use of a compact, lightweight battery, thereby reducing the computer body in size and weight.

To achieve the objects and in accordance with the purpose of the invention, as embodied and broadly described herein, the invention comprises a display with an auxiliary light source; a power supply unit for supplying power to the display and the light source; a detecting unit for detecting a status of the power supply unit and for sending out a signal indicating the status; and a light source control device for controlling the light source in accordance with the signal from the detecting unit.

Further, to achieve the objects and in accordance with the purpose of the invention, as embodied and broadly described herein, the invention also comprises a display with a light source; an input device for sending a variety of commands; a power supply unit for supplying electricity to the display and the light source; a detecting unit for detecting a command sent from the input device; a judging unit for a judging whether the command from the input device is sent within a predetermined time or not and for sending out a signal of the judgement; and a light source controller for controlling the light source in accordance with the signal from the judging unit.

Additionally, to achieve the objects and in accordance with the purpose of the invention, as embodied and broadly described herein, the invention also comprises a display with a light source; a power supply unit for supplying electricity to the display and the light source; a detecting unit for detecting a special status and for sending out a signal of the status; and a light source controller for controlling the light source in accordance with the signal from the detecting unit.

DETAILED DESCRIPTION OF THE PREFERRED EMBODIMENT

A personal computer or the like having a light source controller for a display apparatus of the present invention will be explained below in conjunction with, for example, a backlight controller for a transflective type liquid crystal display (LCD) apparatus with an auxiliary light, such as a backlight unit, by referring to the accompanying drawings.

Figure 1:
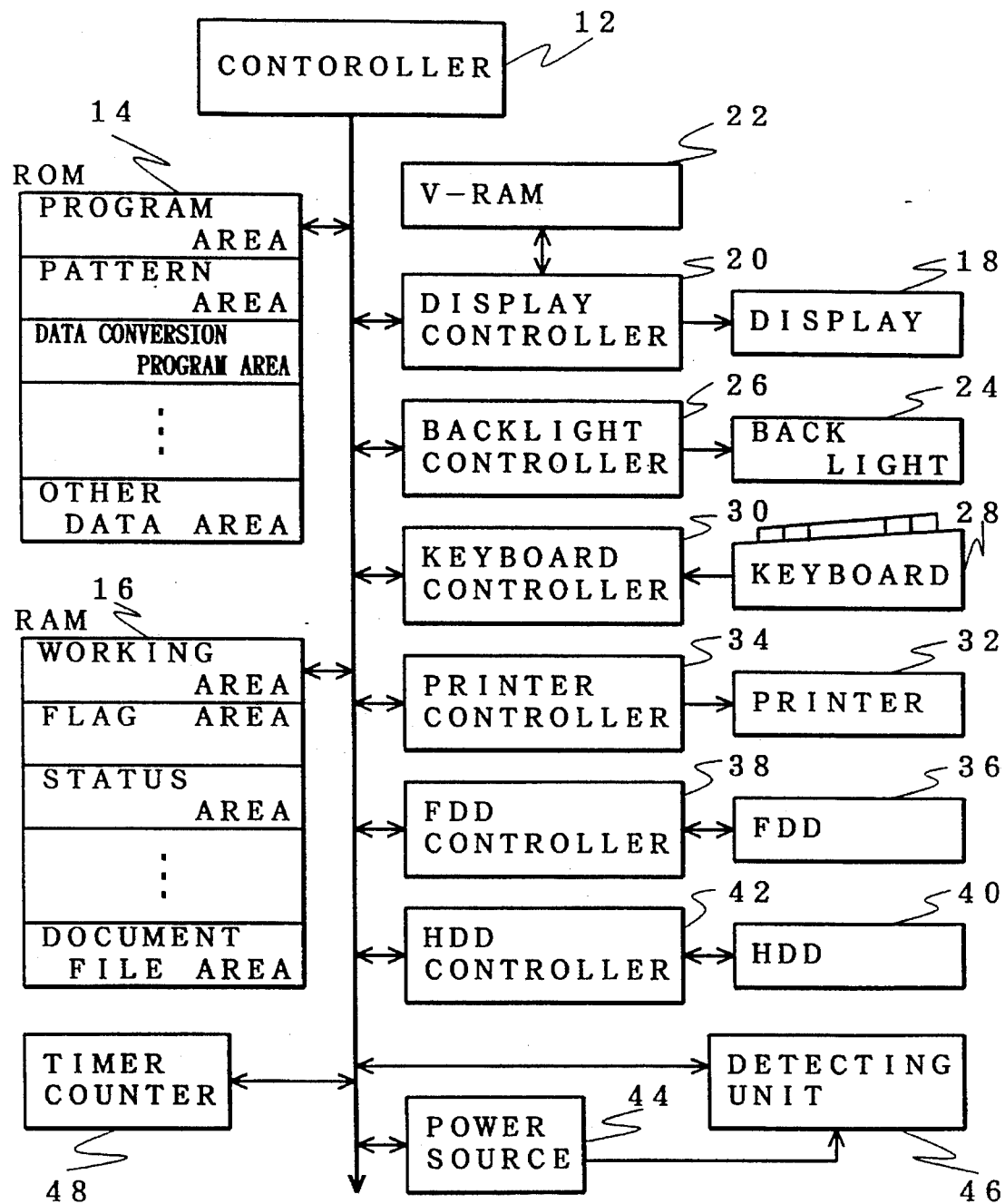
FIG. 1 is a block diagram of a word processor having a light source controller for a display according to first to forth embodiments of the present invention.

The controller according to following embodiments of the present invention will be explained below with reference to FIG. 1.

Controller 12, which is equipped in a word processor, controls the whole system of the word processor. Controller 12 executes information including backlight control programs shown in FIG. 2 to FIG. 5, as well as character pattern data which is stored in a read only memory (ROM) 14.

Random access memory (RAM) 16 has a working area for the controller 12, data storage area, flag area, status area and so on.

Display 18 is constituted by a transflective type liquid crystal display (LCD) with an auxiliary light. Display 18, which is driven by a display controller 20 connected to a V-RAM 22 for storing display data under the control of the controller 12, shows input data, edited data and so on. It is possible for an operator to read some information on the display 18 because transflective type LCD is not necessarily the light source.

Backlight 24 as a light source, which is located at the backside of the display 18, serves as an auxiliary light of the display 18. Backlight 24, which is constituted by an electro luminescence (EL) unit, is controlled in ON/OFF operation (that means to turn on/off the backlight 24) by a backlight controller 26 under the control of the controller 12.

Backlight controller 26 sets/resets a flag A in the flag area of RAM 16 when the backlight 24 is turned on and off.

Keyboard 28, which is connected to keyboard controller 30, has a plurality of data keys and function keys, for example a print key for printing, a switching key for commanding the backlight 24 to turn on and off, FDD key for initializing floppy disk (FD) and making a copy from one FD to another FD. Keyboard 28 sends out various signals to the controller 12 through the keyboard controller 30.

Printer 32 prints desired information, which is stored in RAM 16 or which is transferred to RAM 16 from FD, on a printing sheet under printer controller 34 in accordance with the print key.

Floppy disk drive (FDD) 36, as an external memory, stores made out information, copied information and so on. FDD 36 is controlled by FDD controller 38 under the controller 12. Also hard disk drive 40, as an internal memory, which is controlled by HDD controller 42 under the control of the controller 12, stores made out information, copied information and so on.

Power source 44, which is a built-in battery, provides supplied power for driving each component. The power supply from the power source 44 is detected by detecting unit 46.

Detecting unit 46 detects whether the power supply for each component is more than a prescribed level, which is the lowest limitation in normal operation. Detecting unit 46 sends information about the status of the power supply to the controller 12.

Timer counter 48 checks time. More specifically, timer counter 48 has a function of sending a signal to the controller 12 when no signals are sent from the keyboard 28 within a predescribed time.

Figure 2:
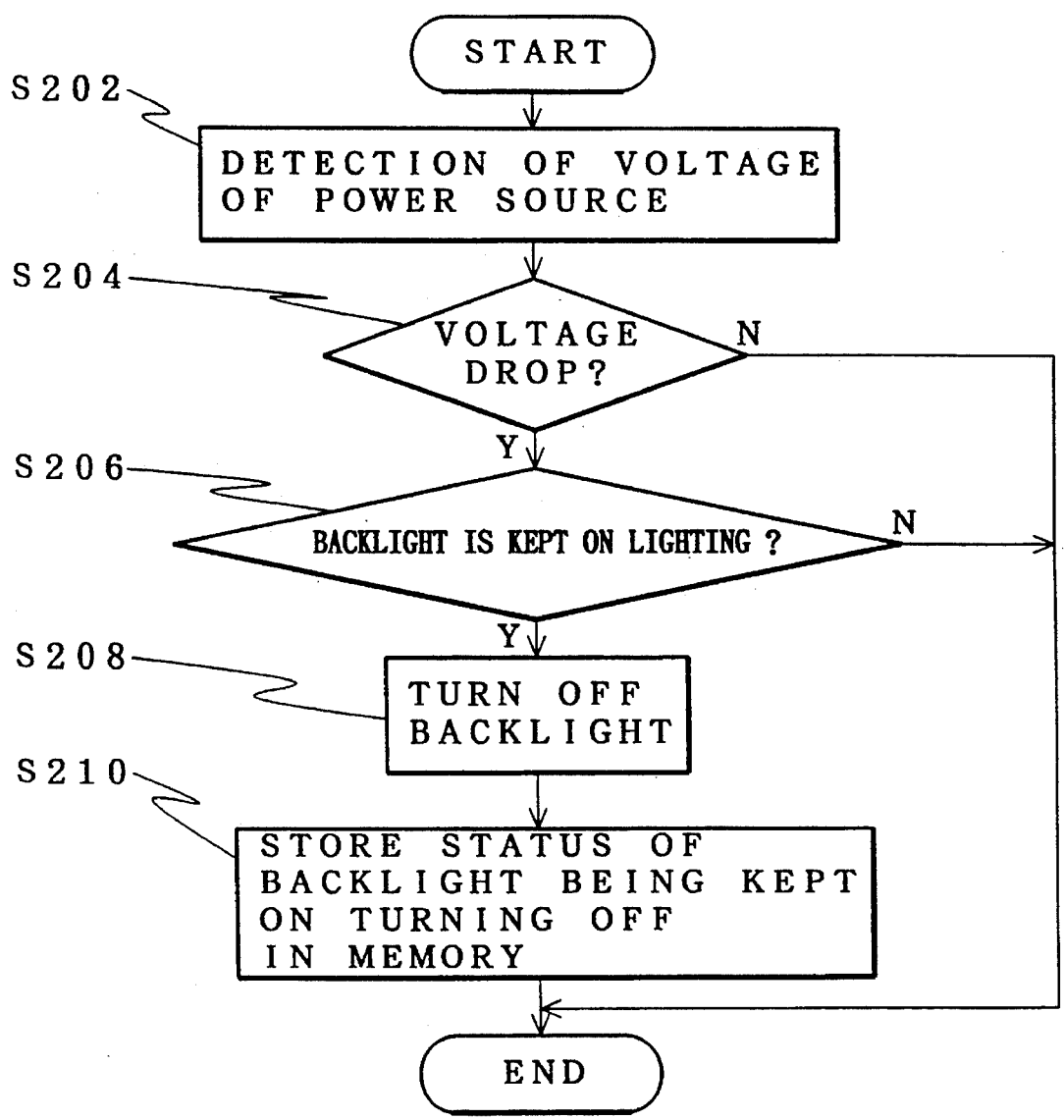
FIG. 2 is a flow chart illustrating the operation of controlling a backlight according to a first embodiment of the present invention.

The operation of the first embodiment will be described with reference to FIG. 2. FIG. 2 is the flow chart showing the control of turning the backlight 24 on and off.

When the word processor is set in a usable state, controller 12 executes the routine of the control in FIG. 2 at intervals of predetermined time. Controller 12 judges whether the signal from the detecting unit 46 indicates the voltage of the supplied power for each component drops to the predetermined level (in step S202).

If controller 12 judges the voltage does not drop to the level, this routine of the control comes to the end (in step S204).

If controller 12 judges the voltage drops to the predetermined level, controller 12 judges whether the backlight 24 is kept on lighting, i.e., maintained lit, or not by examining the status of the flag A in RAM 16 under the control of the backlight controller 26 (in step S206). If the backlight 24 is not maintained lit, that is the backlight 24 is kept on turning off, i.e., maintained turned off, this routine of the control comes to the end. If the controller 12 recognizes the backlight 24 is maintained lit, the controller 12 sends a command for turning off the backlight 24 to the backlight controller 30. Therefore the backlight 24 is turned off (in step S208). And the flag A is changed from the status of turning on the backlight to the status of turning off the backlight (in step S210). Then this routine of the control comes to the end.

Figure 3:
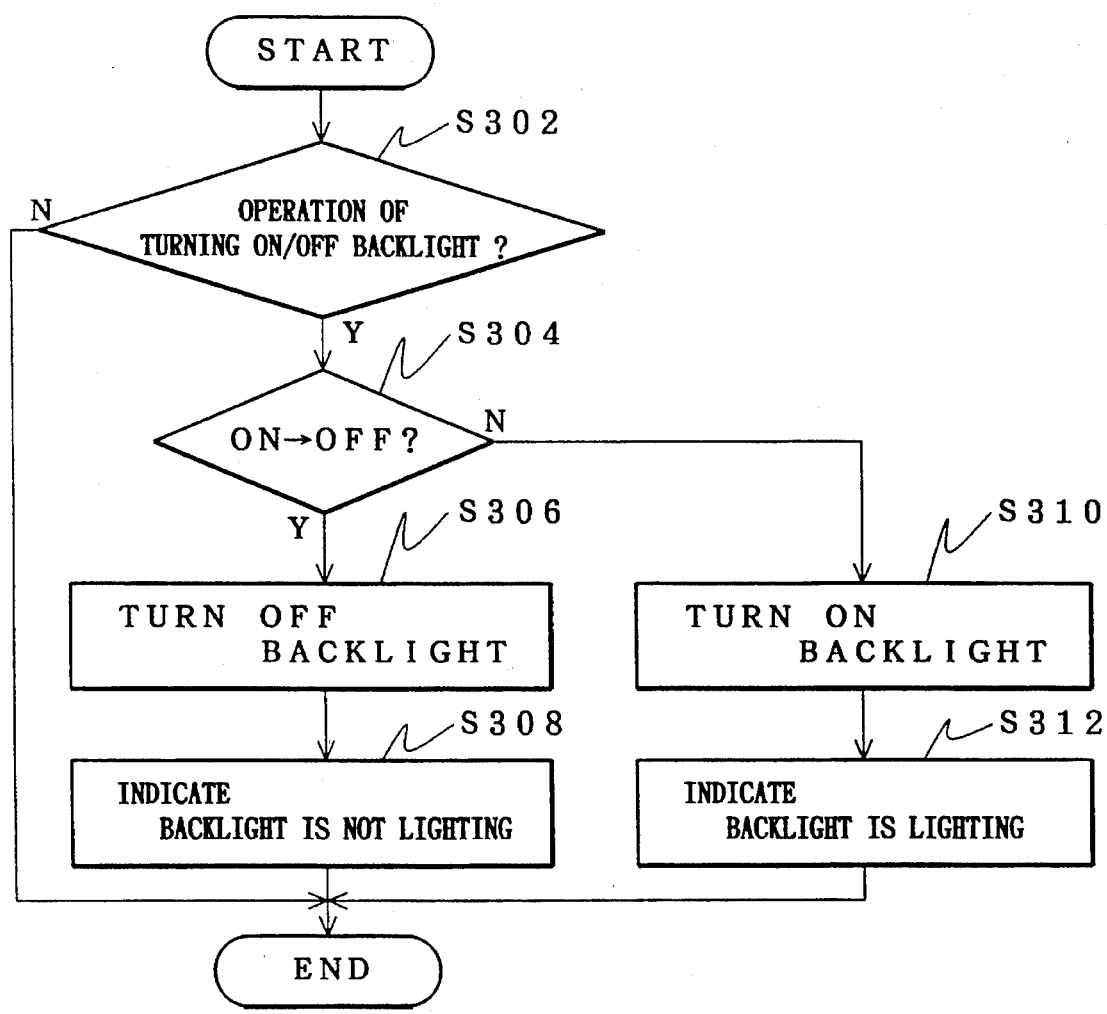
FIG. 3 is a flow chart illustrating the operation of controlling a backlight according to a second embodiment of the present invention.
Figure 6:
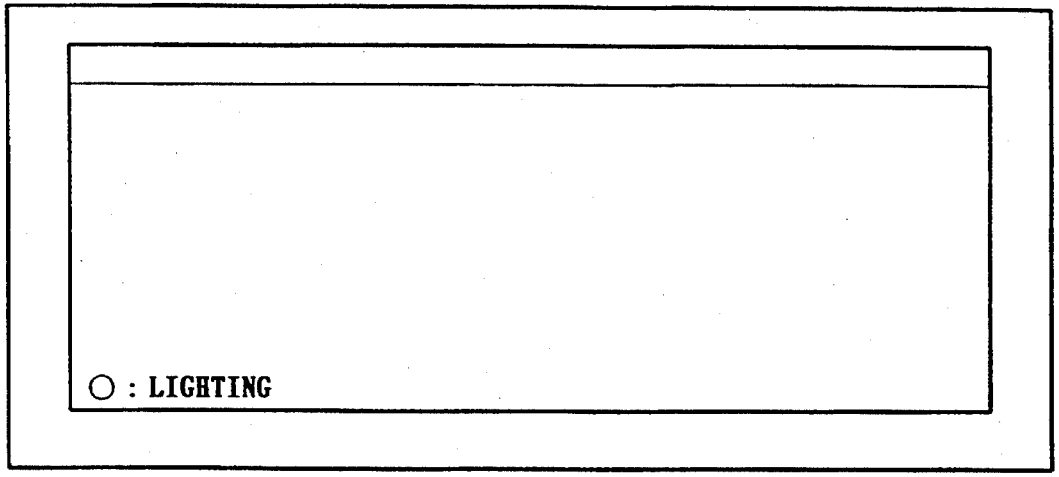
FIG. 6 is a schematic front view of a liquid crystal display apparatus indicating a status of the backlight according to the second embodiment of the present invention.
Figure 7:
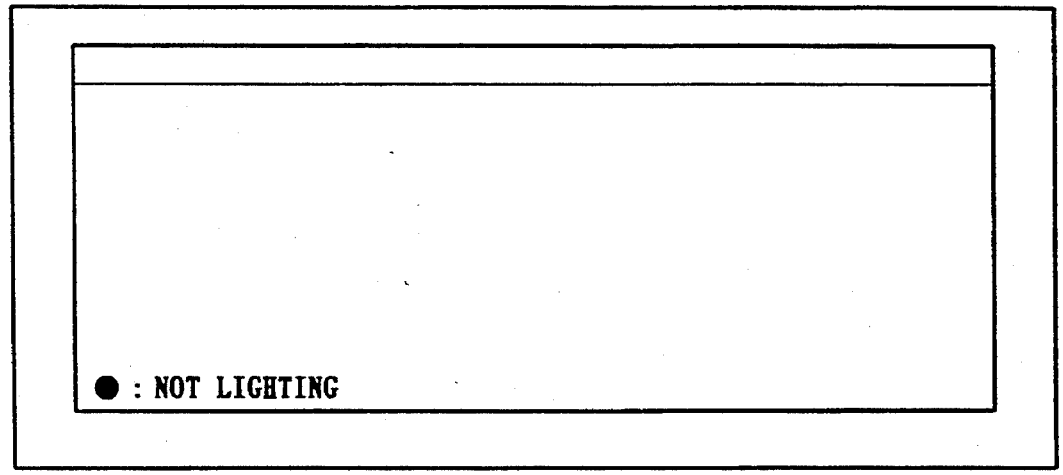
FIG. 7 is a schematic front view of a transflective liquid crystal display apparatus indicating another status of the backlight according to the second embodiment of the present invention.

The operation of the second embodiment will be described with reference to FIGS. 3, 6 and 7. FIG. 3 is the flow chart showing the control of turning the backlight 24 on and off.

If the operation of turning the backlight 24 on and off is executed by the aforementioned embodiment or a special command which depends on pressing a special function key (the switching key) from the keyboard 28, the controller 12 judges whether the operation indicates turning the backlight 24 from on to off or not by examining the status of the flag A in RAM 16 under the control of the backlight controller 26 (in step S302 to S304). If the operation is to turn the backlight 24 from on to off, a mark which indicates "backlight is not lighting" is shown on the display 18 (see FIG. 6) after the backlight 24 is turned off (in step S306 to S308). If the operation is to turn the backlight 24 from off to on, another mark which indicates "backlight is lighting" is shown on the display 18 (see FIG. 7) after the backlight 24 is turned on (in step S310 to S312).

Figure 4:
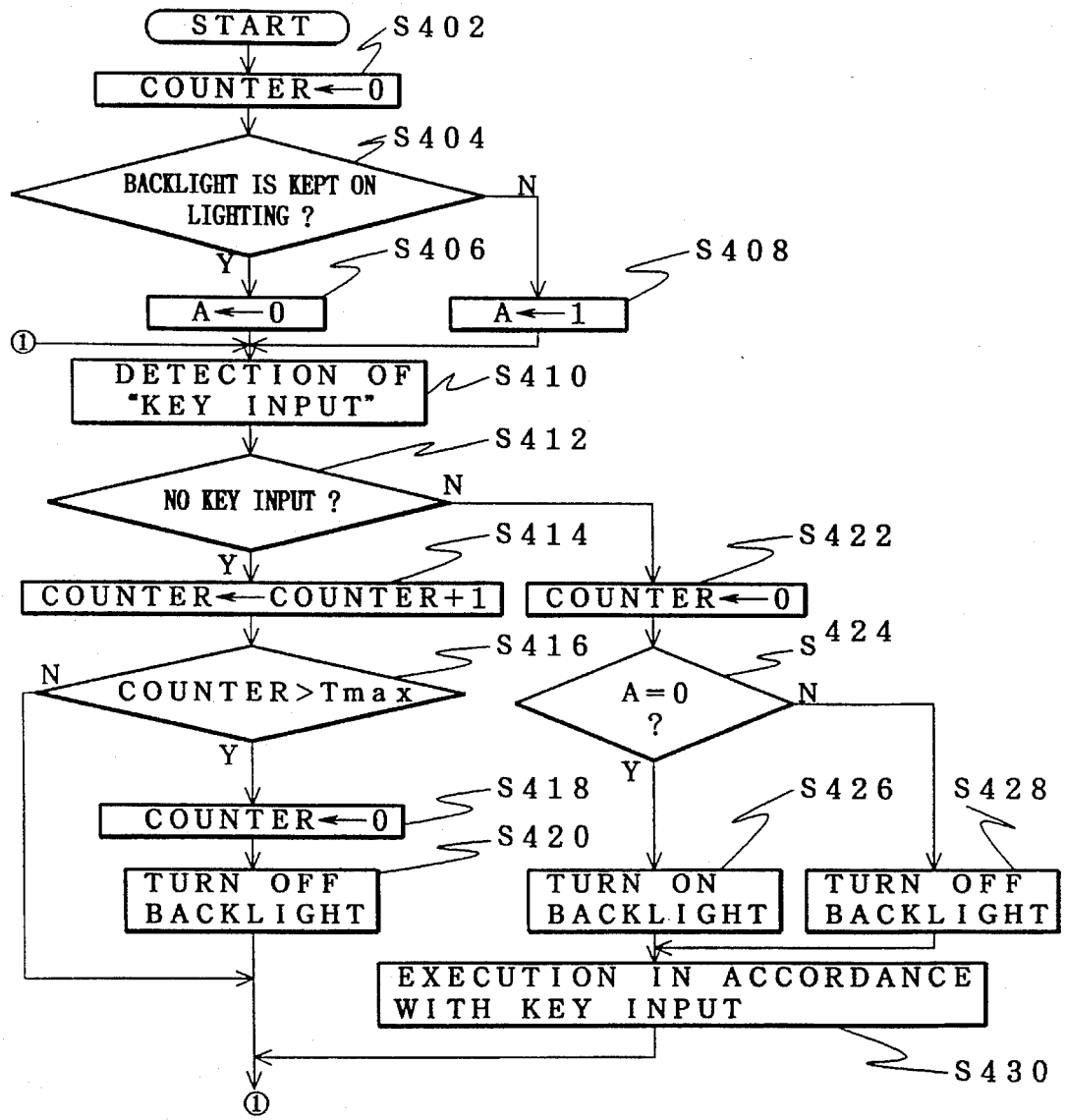
FIG. 4 is a flow chart illustrating the operation of controlling a backlight according to a third embodiment of the present invention.

The operation of the third embodiment will be described with reference to FIG. 4. FIG. 4 is the flow chart showing the control of turning the backlight 24. This embodiment shows that backlight 24 on and off is turned off if there is no access to the system within a predetermined time.

The controller 12 initializes the timer counter 48 to set a count value 0 (in step S402). The controller 12 judges whether the backlight 24 is maintained lit or not by examining the flag A in RAM 16 under the control of the backlight controller 26 (in step S404 to S408). Then the controller 12 drives the timer counter 48 to detect whether a key is pressed or not (in step S410 and S412). The count value is increased by one at intervals of the predetermined time. The count value is compared with a predetermined value "T max" whenever the count value is increased. If the added count value is smaller than the "T max" (in steps S416), steps S410 to S416, which are detecting steps for detection of key input, are re-executed. If a "key input" is detected before the added count value amounts to the "T max", the timer counter 48 is initialized to 0 again (in step S422). And the process of turning the backlight 24 on or off in accordance with the status of the flag A is executed (in steps S424 to S428). Then the routine of detection of a key input is executed again.

If the count value is larger than the "T max" (in step S416), the timer counter is initialized (in step S418). And the process of changing the status of the backlight 24, which includes the process of changing the status of the flag A, is executed in order to turn off the backlight 24 (in step S420). Then the routine of detection of a key input is executed again.

Figure 5:
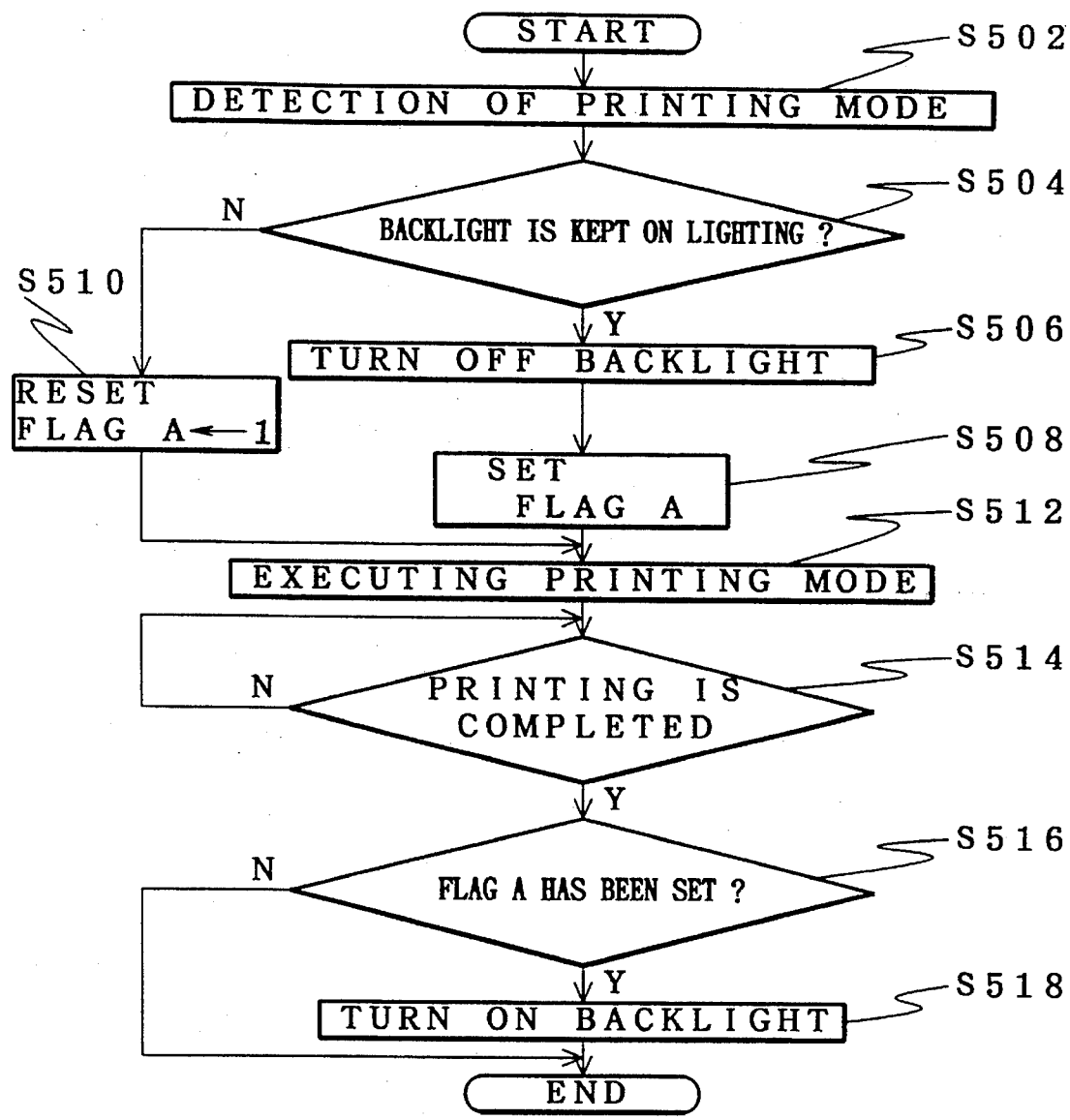
FIG. 5 is a flow chart illustrating the operation of controlling a backlight according to a forth embodiment of the present invention.

The operation of the forth embodiment will be described with reference to FIG. 5. FIG. 5 is the flow chart showing the control of turning the backlight 24 on and off.

When the print key on the keyboard 28 is pressed for printing, print command is sent to the printer controller through the keyboard controller 30 under the control of the controller 12. The printer controller 34 reads out a determined document or the like from the RAM 16 in accordance with the print command. Then the printer controller 34 makes the printer 32 print out the document on a sheet.

When the backlight controller 26 detects the print command as a printing mode under the control of the controller 12 (in step S502), the backlight controller 26 judges whether the backlight 24 is lighting or not by examining the status area in the RAM 16 (in step S504).

If the backlight 24 is kept on lighting, i.e., maintained lit, the backlight controller 26 turns off the backlight 24 and sets the flag A for memorizing this operation (in steps S506 to S508).

If the backlight 24 is maintained turned off, the flag A is reset (in step S510).

After the printing mode is completed (in steps S512 to S514), the backlight controller 26 examines the status of the flag A. If the flag A has been set (in step S516) based on the aforementioned steps S506 to S508, the backlight 24 is changed from the status of not lighting to the status of lighting (in step S518).

In the aforementioned embodiments, wasteful power consumption of the backlight as a light source can be prevented without interfering with an operation of the word processor. Especially, when the word processor is to be driven by a battery, the service life of the battery can be prolonged. This can further reduce the battery in size and weight, and hence a compact word processor or the like can be realized.

The present invention can be changed or modified in a variety of ways without departing from the spirit and scope of the present invention, and such modifications are intended to be included within this invention as defined by the following claims.

For example, in the aforementioned forth embodiment, it is possible to control the backlight, not only by the print command but also by a FDD command for initializing a FD or copying a FD to another FD, or a HDD command for initializing or copying an HD.

In this manner, it is possible to decrease the supplied power for the backlight in backlight control.

What is claimed is:

1. A personal computer having at least one component powered by electricity, the personal computer comprising:

a display having an auxiliary light source;

power supply means for supplying electricity to the at least one component, to the display, and to the auxiliary light source;

detecting means operatively connected to the power supply means for detecting a power level status of the power supply means and for outputting a signal indicating the power level status; and light source control means operatively connected to the detecting means for controlling operation of the auxiliary light source in accordance with the signal from the detecting means.

2. The personal computer according to claim 1, further comprising indicating means operatively connected to the display for indicating an operation status of the auxiliary light source on the display.

3. A personal computer having at least one peripheral component driven by electricity, comprising:

a display having an auxiliary light source;

power supply means for supplying electricity to the display and to the auxiliary light source;

detecting means operatively connected to the at least one peripheral component for detecting an operating status mode of the at least one peripheral component and for outputting a signal of the operating status mode; and light source control means operatively connected to the detecting means for controlling operation of the auxiliary light source in accordance with the signal from the detecting means.

4. The personal computer according to claim 3, further comprising indicating means operatively connected to the display for indicating an operation status of the auxiliary light source on the display.

5. The personal computer according to claim 3, wherein the at least one peripheral component includes a printer and the detecting means detects the operating status mode of the printer.

6. The personal computer according to claim 3, wherein the light source control means is adapted to interrupt the electricity being supplied from the power supply means to the auxiliary light source in accordance with the signal from the detecting means.

7. The personal computer according to claim 3, wherein the at least one peripheral component includes a disk drive and the detecting means detects the operating status mode of the disk drive.

* * * * *